United States Patent
Want et al.

(10) Patent No.: US 9,911,136 B2
(45) Date of Patent: Mar. 6, 2018

(54) METHOD AND SYSTEM FOR PROVIDING SIGN DATA AND SIGN HISTORY

(71) Applicant: Google Inc., Mountain View, CA (US)

(72) Inventors: Roy Want, Los Altos, CA (US); William Noah Schilit, Mountain View, CA (US)

(73) Assignee: Google LLC, Mountain View, CA (US)

( * ) Notice: Subject to any disclaimer, the term of this patent is extended or adjusted under 35 U.S.C. 154(b) by 1263 days.

(21) Appl. No.: 13/908,042

(22) Filed: Jun. 3, 2013

(65) Prior Publication Data

US 2014/0358685 A1  Dec. 4, 2014

(51) Int. Cl.
| | |
|---|---|
| G06Q 30/00 | (2012.01) |
| G06Q 30/02 | (2012.01) |
| G09F 27/00 | (2006.01) |
| H04W 4/02 | (2018.01) |
| H04W 4/00 | (2018.01) |
| H04L 29/08 | (2006.01) |

(52) U.S. Cl.
CPC ......... *G06Q 30/0261* (2013.01); *G06Q 30/02* (2013.01); *G09F 27/00* (2013.01); *H04W 4/02* (2013.01); *H04L 67/10* (2013.01); *H04W 4/008* (2013.01)

(58) Field of Classification Search
None
See application file for complete search history.

(56) References Cited

U.S. PATENT DOCUMENTS

| | | | |
|---|---|---|---|
| 7,596,602 B2 | 9/2009 | Ellman | |
| 8,516,075 B2 | 8/2013 | Seetharam et al. | |
| 2002/0116268 A1 | 8/2002 | Fakuda | |
| 2004/0184588 A1* | 9/2004 | Yueh | G06F 1/1601 379/100.15 |
| 2006/0260161 A1 | 11/2006 | Hamilton | |
| 2006/0287913 A1* | 12/2006 | Baluja | G06Q 30/02 705/14.54 |

(Continued)

FOREIGN PATENT DOCUMENTS

EP    0991043    4/2000

OTHER PUBLICATIONS

International Preliminary Report on Patentability in International Application No. PCT/US2014/040482, dated Dec. 17, 2015, 14 pages.

(Continued)

*Primary Examiner* — Matthew T Sittner
(74) *Attorney, Agent, or Firm* — Fish & Richardson P.C.

(57) ABSTRACT

Methods and systems include determining that a device is proximate to a sign, providing sign identification information associated with the sign, and providing a sign history. A request for sign data associated with the sign identification information may be received, and sign data may be provided. Determining that a sign is proximate to a device may be based on a signal from the sign and/or the device. Additionally, a location of a device may be received and it may be determined that the device is proximate to a sign based on determining a location of the sign and determining that the difference in the location of the device and the location of the sign is less than a given threshold. A request for sign data associated with the sign may be sent. In response, sign data may be received, stored, and displayed.

20 Claims, 9 Drawing Sheets

(56) References Cited

U.S. PATENT DOCUMENTS

| | | |
|---|---|---|
| 2007/0024580 A1 | 2/2007 | Sands |
| 2008/0045236 A1 | 2/2008 | Nahon et al. |
| 2008/0059199 A1 | 3/2008 | Hataoka et al. |
| 2008/0089288 A1* | 4/2008 | Anschutz ............... G06Q 30/02 370/331 |
| 2008/0183619 A1 | 7/2008 | Gould |
| 2008/0284566 A1* | 11/2008 | Zai ....................... G06Q 10/087 340/7.56 |
| 2009/0012880 A1 | 1/2009 | Tortola |
| 2009/0062939 A1 | 3/2009 | Park |
| 2009/0144157 A1 | 6/2009 | Saracino |
| 2009/0267867 A1 | 10/2009 | Gonia |
| 2010/0211431 A1* | 8/2010 | Lutnick .................. G06Q 30/02 705/14.12 |
| 2010/0250341 A1 | 9/2010 | Hauser |
| 2011/0167263 A1 | 7/2011 | Cross et al. |
| 2011/0191516 A1 | 8/2011 | Xiong |
| 2011/0199290 A1 | 8/2011 | Vendrow |
| 2012/0022776 A1* | 1/2012 | Razavilar ........... G01C 21/3697 701/482 |
| 2012/0059875 A1* | 3/2012 | Clark .................... G06F 3/0484 709/203 |
| 2012/0081615 A1 | 4/2012 | Starr |
| 2012/0084662 A1 | 4/2012 | Navarro |
| 2012/0086563 A1 | 4/2012 | Arling |
| 2012/0146918 A1 | 6/2012 | Kreiner |
| 2012/0169932 A1 | 7/2012 | Kim |
| 2012/0194411 A1 | 8/2012 | Tajima |
| 2012/0196586 A1 | 8/2012 | Grigg et al. |
| 2012/0262277 A1* | 10/2012 | Oliveira ................. H04L 67/18 340/8.1 |
| 2013/0069769 A1 | 3/2013 | Pennington |
| 2013/0080221 A1 | 3/2013 | Lin |
| 2013/0107732 A1 | 5/2013 | O'Donnell et al. |
| 2013/0225078 A1* | 8/2013 | Johansson ............. H04W 76/02 455/41.2 |
| 2013/0252590 A1 | 9/2013 | Sivertsen |
| 2013/0342309 A1* | 12/2013 | Jiang .................. H04N 21/4415 340/3.1 |
| 2014/0022192 A1 | 1/2014 | Hatanaka |
| 2014/0022454 A1* | 1/2014 | Oh .......................... H04N 5/04 348/515 |
| 2014/0058812 A1* | 2/2014 | Bender .............. G06Q 30/0209 705/14.12 |
| 2014/0062857 A1 | 3/2014 | She |
| 2014/0067549 A1 | 3/2014 | Park |
| 2014/0068036 A1 | 3/2014 | Patil |
| 2014/0078054 A1 | 3/2014 | Gardenfors |
| 2014/0085179 A1 | 3/2014 | Krig et al. |
| 2014/0095306 A1 | 4/2014 | Avalos et al. |
| 2014/0149221 A1 | 5/2014 | Rycyna, III |
| 2014/0167936 A1 | 6/2014 | Lee |
| 2014/0187256 A1* | 7/2014 | Modali ................. H04W 4/027 455/456.1 |
| 2014/0218289 A1 | 8/2014 | Dai |
| 2014/0222578 A1 | 8/2014 | Poornachandran |
| 2014/0282232 A1 | 9/2014 | Oh |
| 2014/0333509 A1 | 11/2014 | Yuann |
| 2014/0358685 A1* | 12/2014 | Want .................. G06O 30/0261 705/14.58 |
| 2015/0046269 A1 | 2/2015 | Liu |
| 2015/0084838 A1 | 3/2015 | Chang |
| 2015/0169189 A1 | 6/2015 | Want |
| 2015/0227338 A1 | 8/2015 | Hoshikawa |
| 2016/0062646 A1 | 3/2016 | Azam |

OTHER PUBLICATIONS

Office Action issued in European Application No. 14734676.1, dated Mar. 8, 2017, 4 pages.

Intention to Grant in European Application No. 14734676.1, dated Sep. 18, 2017, 7 pages.

International Search Report and Written Opinion in International Application No. PCT/US2014/040482, dated Dec. 2, 2014, 19 pages.

* cited by examiner

DEPARTURES

| AIRLINE | FLT. NO. | DESTINATION | DEPARTURE TIME | GATE | STATUS |
|---|---|---|---|---|---|
| AA | 223 | New York - LGA | 1:25pm | A6 | Delayed Now 2:10pm |
| DELTA | 98 | Atlanta | 1:35pm | C45 | On Time |
| UNITED | 463 | Denver | 2:05pm | A8 | On Time |
| US | 8763 | Washington, D.C. - DCA | 2:10pm | D7 | On Time |
| JETBLUE | 287 | Las Vegas | 2:45pm | A12 | Canceled |
| QAL | 945 | Doha | 11:00am | C22 | Boarding |
| VIRGIN | 465 | San Francisco | 12:10pm | D9 | Delayed Now 1:30pm |
| BA | 76 | Male | 3:15pm | D3 | On Time |

METHOD AND SYSTEM FOR PROVIDING SIGN DATA AND SIGN HISTORY

BACKGROUND

Signs such as advertisements, displays, posters, billboards and the like typically contain useful information and content. Consumers who are within proximity of a sign may pause to either memorize or record the content of the sign. For example, a consumer may take a photo of a sign indicating a model and price of a product at an electronics store. As another example, a consumer may attempt to memorize the contents of a departure sign that includes gate information for his departing flight. However, both memorization and recording of sign information and content can be difficult and cumbersome for consumers. In general, a consumer may be unable to remember the content of a sign that they previously encountered and the act of recording requires effort as well as a decision by the consumer that retrieval of the sign content is essential. Further, sign content may change after the user has moved away from the sign and the sign information recorded by the user may become obsolete. In many cases, a consumer may not know until later, after he is no longer within proximity of the sign, that he wishes to retrieve the contents of a sign.

BRIEF SUMMARY

According to an implementation of the disclosed subject matter, a method includes determining that a device is proximate to a sign. At a first time, sign identification information associated with the sign may be provided. A request may be received for sign data associated with the sign identification information, and sign data may be provided.

An implementation of the disclosed subject matter provides a method that includes determining that a sign is proximate to a device based on a signal from at least one of the sign and the device. A request may be sent, at a first time, to the sign for sign data associated with the sign, and as a result, sign data may be received from the sign, and the sign data may be stored. Next, a request for the sign data may be received, and as a result, the sign data may be displayed.

An implementation of the disclosed subject matter provides a method that includes determining that a device is proximate to a first sign and storing first sign data in response to determining that the device is proximate to the first sign. Next, it may be determined that a device is proximate to a second sign and second sign data may be stored in response to determining that the device is proximate to the second sign. Next, a request for a sign history may be received from a user and the sign history may be provided to the user.

According to an implementation of the disclosed subject matter, a method includes receiving a location of a device and determining that the device is proximate to a sign. Specifically, determining that a device is proximate to a sign may include determining a location of the sign and determining that the difference in the location of the device and the location of the sign is less than a given threshold. Next, a request for sign data associated with the sign may be received at a first time, and as a result, sign data may be provided.

An implementation of the disclosed subject matter provides a system that includes a processor configured to determine that a device is proximate to a sign. At a first time, sign identification information may be provided. Next, a request for sign data associated with the sign identification information may be received, and sign data may be provided.

According to an implementation of the disclosed subject matter, a system includes a computer-readable medium storing sign data and a processor configured to determine that a sign is proximate to a device based on a signal from at least one of the sign and the device. A request may be sent at a first time, to the sign, for sign data associated with the sign. Sign data may be received from the sign. Next, a request for the sign data may be received, and the sign data may be displayed.

According to an implementation of the disclosed subject matter, a system includes a processor configured to receive a location of a device and determine that the device is proximate to a sign. The determination that a device is proximate to a sign may include determining a location of the sign and determining that the difference in the location of the device and the location of the sign is less than a given threshold. A request for sign data associated with the sign may be received at a first time, and as a result, sign data may be provided.

Implementations as disclosed herein may provide users with the ability to view and browse sign data for signs they have encountered. Thus, a user may be able to view sign content on his mobile device, including sign content that has been updated, at a later time after he is no longer in proximity of the sign. Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

In general, it may be helpful for a user to be able to access data from a sign on his mobile device, either when he is in proximity of the sign or at a later time after he is no longer in proximity of the sign. Sign data can include sign content as well as information about the sign. Sign content can include information shared by the sign about entities other than the sign, such as flight data, product offerings, safety information and the like. Examples of information about the sign can include a sign identifier, a sign location, a sign owner, a sign type (e.g., safety-related, advertisement, operational information such as flight status, etc.), etc. Sign data may be automatically provided to a user's mobile device directly from the sign or from a sign data provider. For example, a user at the entrance of a grocery store may pass a sign displaying content related to a sale on cereal. While the user is in proximity of the sign, the user's mobile device may automatically store the content of the sign received from the sign. At a later point, when the user arrives in the cereal aisle of the grocery store, the user may wish to retrieve the sign content related to the sale of cereal he saw upon entering the grocery store. The user may request, on his mobile device, the content from signs that have recently been within a threshold proximity to the mobile device, from among which the user may find the sign related to the sale on cereal. As a result, the content of the sign related to the sale on cereal may be displayed on the user's mobile device.

As another example, a user walking in a shopping mall may pass a sign displaying content related to the grand opening of a new store and its location in the mall. As the user passes within proximity of the sign, the user's mobile device may receive sign identification information from the sign. At a later point, when the user wishes to visit the new store in the mall, the user may wish to retrieve the sign content relating to the location of the store in the mall. The user may request, on his mobile device, the content from signs that have recently been within a threshold proximity to his mobile device. As a result, the mobile device may provide the sign identification information to a sign data provider, and in response, the sign data provider may provide sign data associated with the received sign identification information. In particular, the sign data may include content related to the grand opening of the store and its location in the mall.

In another embodiment, as the user passes within proximity of the sign, a sign data provider may receive the location of the user's mobile device and determine that the device is proximate to the sign. Specifically, determining that the device is proximate to the sign may be based on a determination of the location of the sign and determining that the location of the device is within a threshold proximity of the location of the sign. As a result, the sign provider may automatically provide the mobile device with sign identification information. At a later point, when the user wishes to retrieve the sign content, the user may request, on his mobile device, the content from signs that have recently been within a threshold proximity to the mobile device. As a result, the mobile device may provide the sign identification information to the sign data provider, and in response, the sign data provider may provide sign data associated with the received sign identification information. Alternatively, upon determination that the device and sign are within proximity to each other, the sign data provider may automatically provide sign data to the mobile device. The received sign data may be displayed on the mobile device upon request for sign data on the device. The sign data may also be provided to a user account and the sign data may be viewed/displayed on another device, such as the user's desktop computer, by accessing the user's account.

Figure 1:
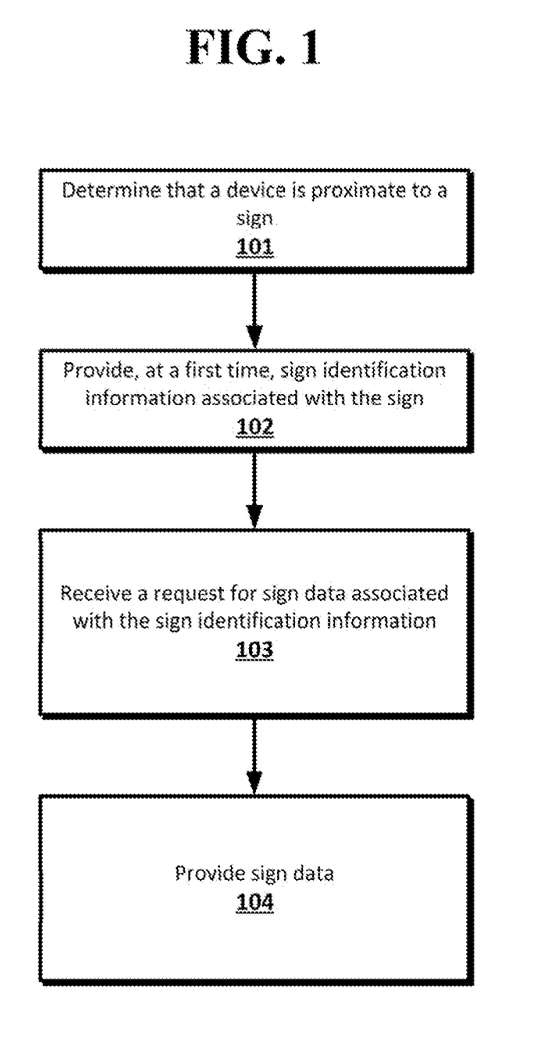
FIG. 1 shows an example process according to an implementation of the disclosed subject matter.

Implementations of the disclosed subject matter provide methods, systems, and products for receiving the content of a sign when a mobile device is within a threshold proximity of the sign, as shown in FIG. 1. According to an implementation of the disclosed subject matter, a method includes determining that a device is proximate to a sign, at 101. At 102, sign identification information associated with the sign may be provided at a first time. Next, a request may be received for sign data associated with the sign identification information at 103, and sign data may be provided at 104.

Figure 2:
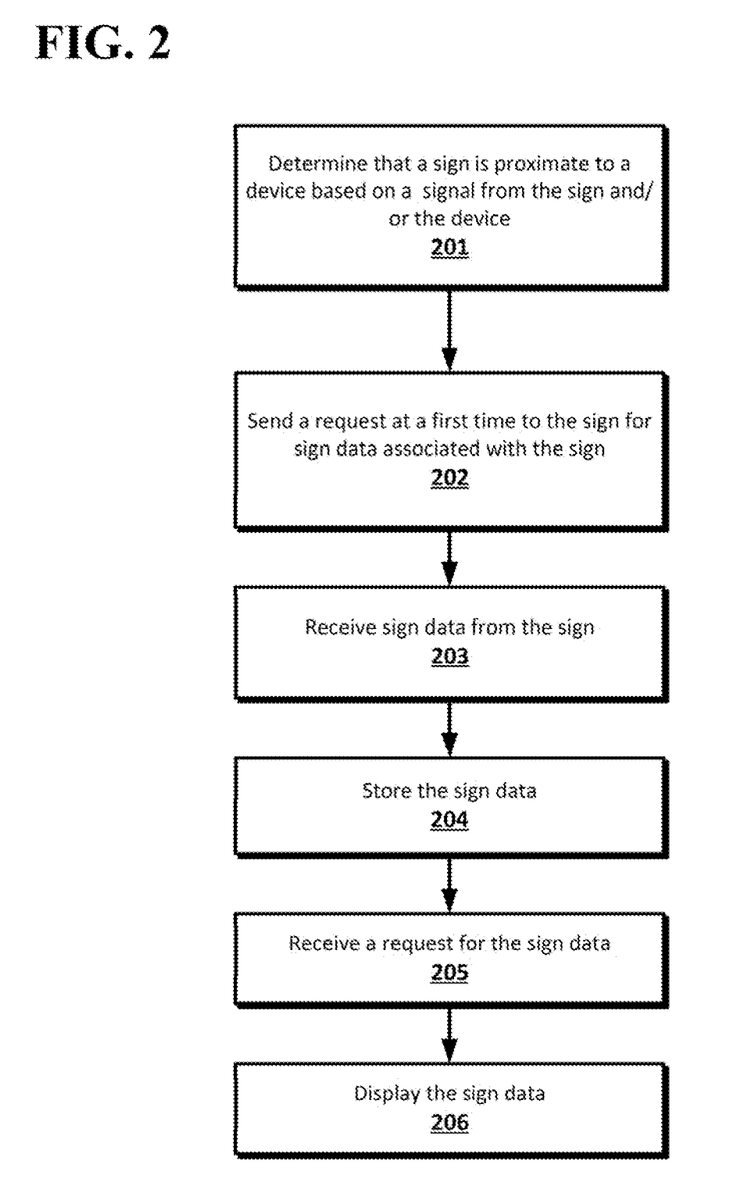
FIG. 2 shows an example process according to an implementation of the disclosed subject matter.

As shown in FIG. 2, an implementation of the disclosed subject matter provides a method that includes determining that a sign is proximate to a device based on a signal from at least one of the sign and the device, at 201. At 202, a request may be sent, at a first time, to the sign for sign data associated with the sign, and as a result, sign data may be received from the sign at 203, and the sign data may be stored at 204. Next, a request for the sign data may be received at 205, and as a result, the stored sign data may be displayed at 206.

Figure 3:
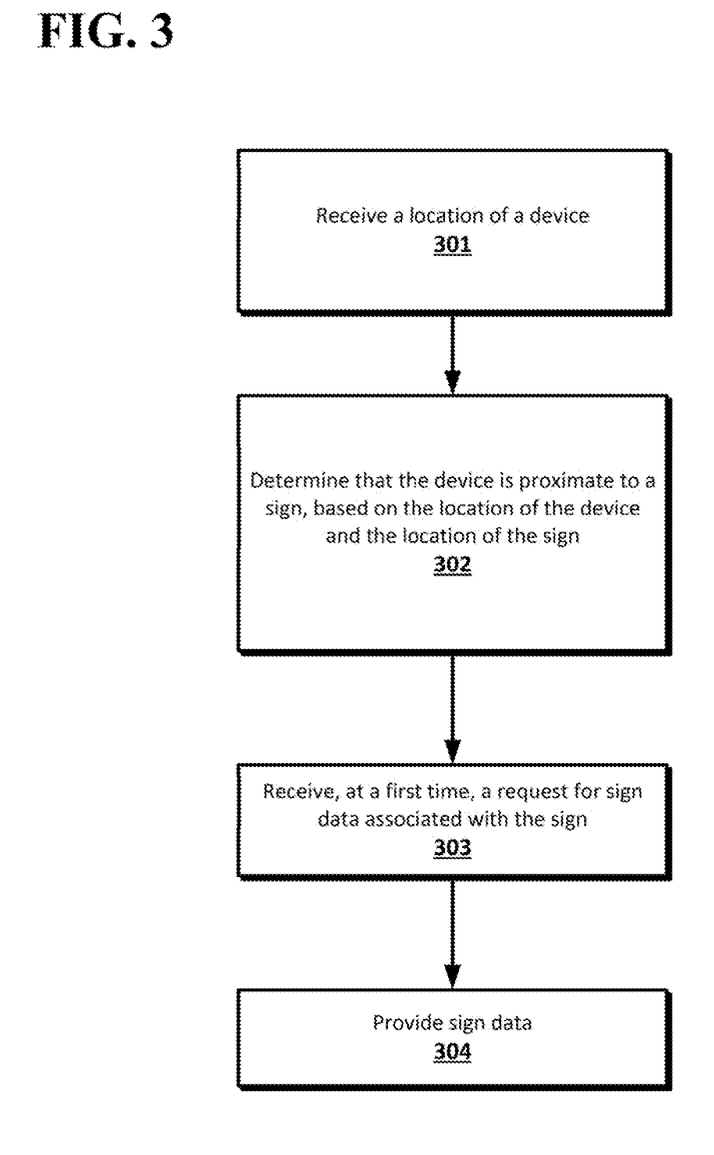
FIG. 3 shows an example process according to an implementation of the disclosed subject matter.

FIG. 3 shows an implementation of the disclosed subject matter, including receiving a location of a device at 301 and determining that the device is proximate to a sign at 302. Specifically, determining that a device is proximate to a sign may include determining a location of the sign and determining that the difference in the location of the device and the location of the sign is less than a given threshold. Next, a request for sign data associated with the sign may be received at a first time at 303, and as a result, sign data may be provided at 304.

Figure 4:
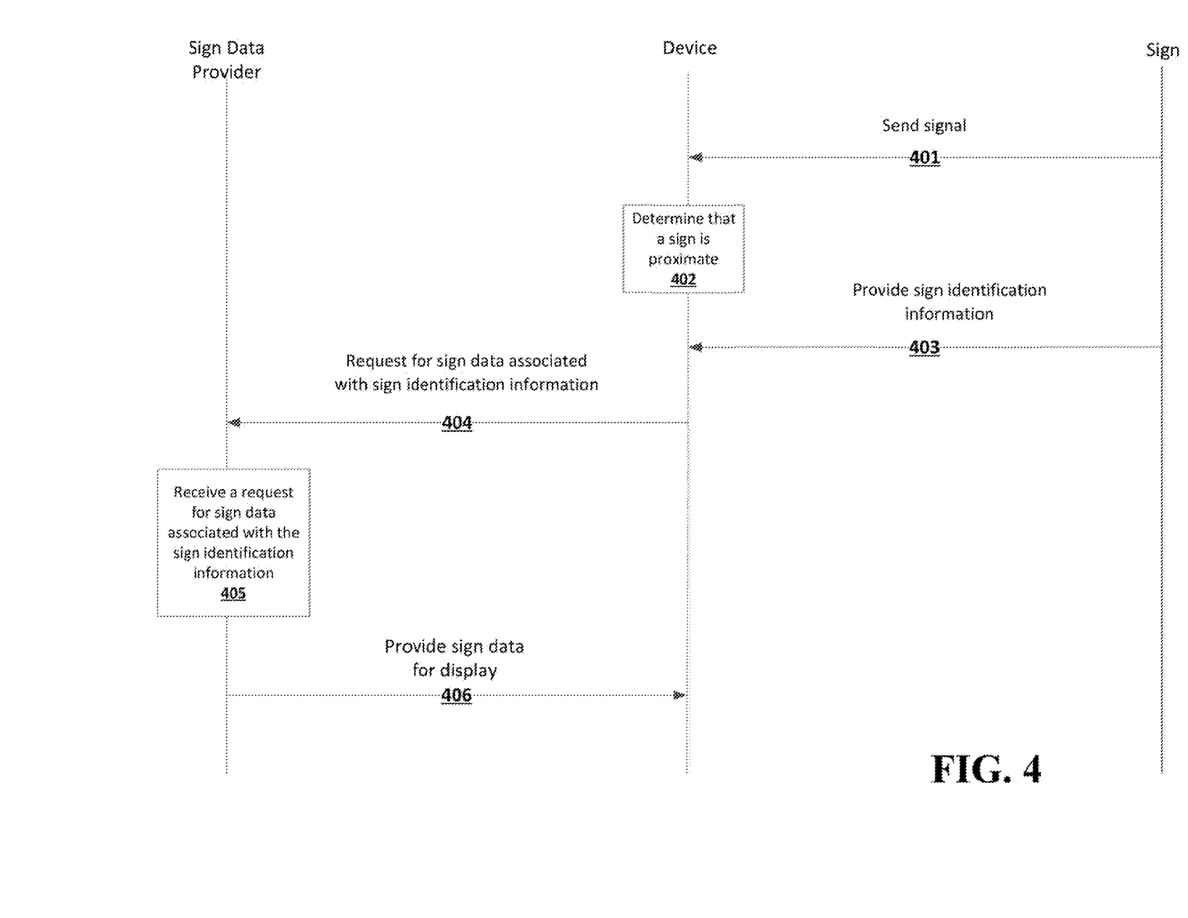
FIG. 4 shows an example information flow according to an implementation of the disclosed subject matter.

As shown in FIG. 4, an implementation of the disclosed subject matter provides a system that includes a processor configured to provide sign data to a device. A sign may send a signal to a device, at 401. At 402, the device may determine that a sign is proximate based on the signal received from the sign. Next, at 403, sign identification information may be provided by the sign to the device, at a first time. At 404, a request for sign data associated with the sign identification information may be sent by the device and received by a sign data provider at 405. As a result, the sign data provider may provide sign data to the device, at 406.

Figure 5:
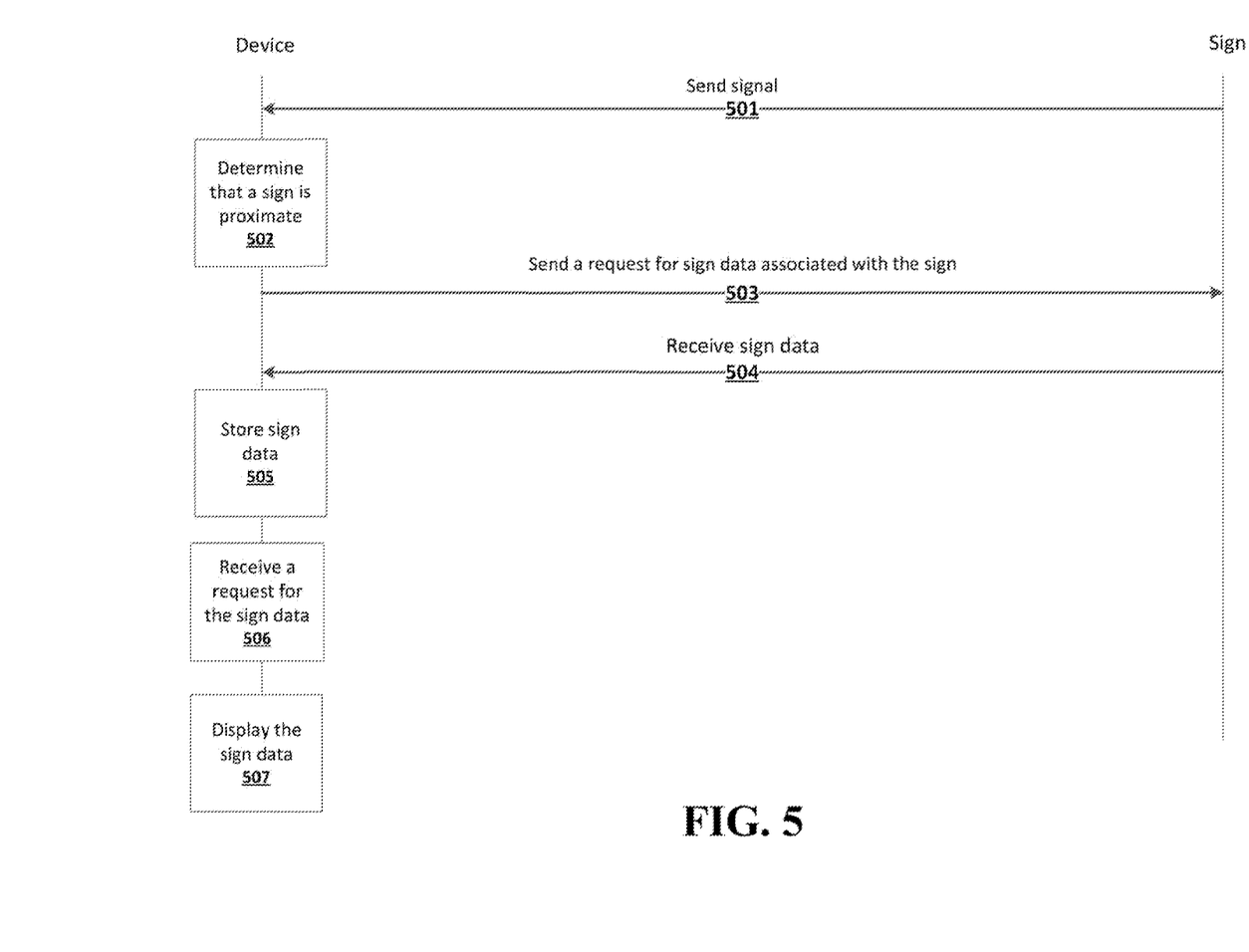
FIG. 5 shows an example information flow according to an implementation of the disclosed subject matter.

FIG. 5 shows an implementation of the disclosed subject matter which provides a system that includes a computer-readable medium storing sign data and a processor configured to determine that a sign is proximate at a device, at 502, based on a signal from at least one of the sign, at 501, and the device. At 503, a request may be sent at a first time by the device, to the sign, for sign data associated with the sign. At 504, sign data may be received from the sign and the sign data may be stored at the device, 505. Next, at 506, a request for the sign data may be received at the device, and the sign data may be displayed at the device, at 507.

Figure 6:
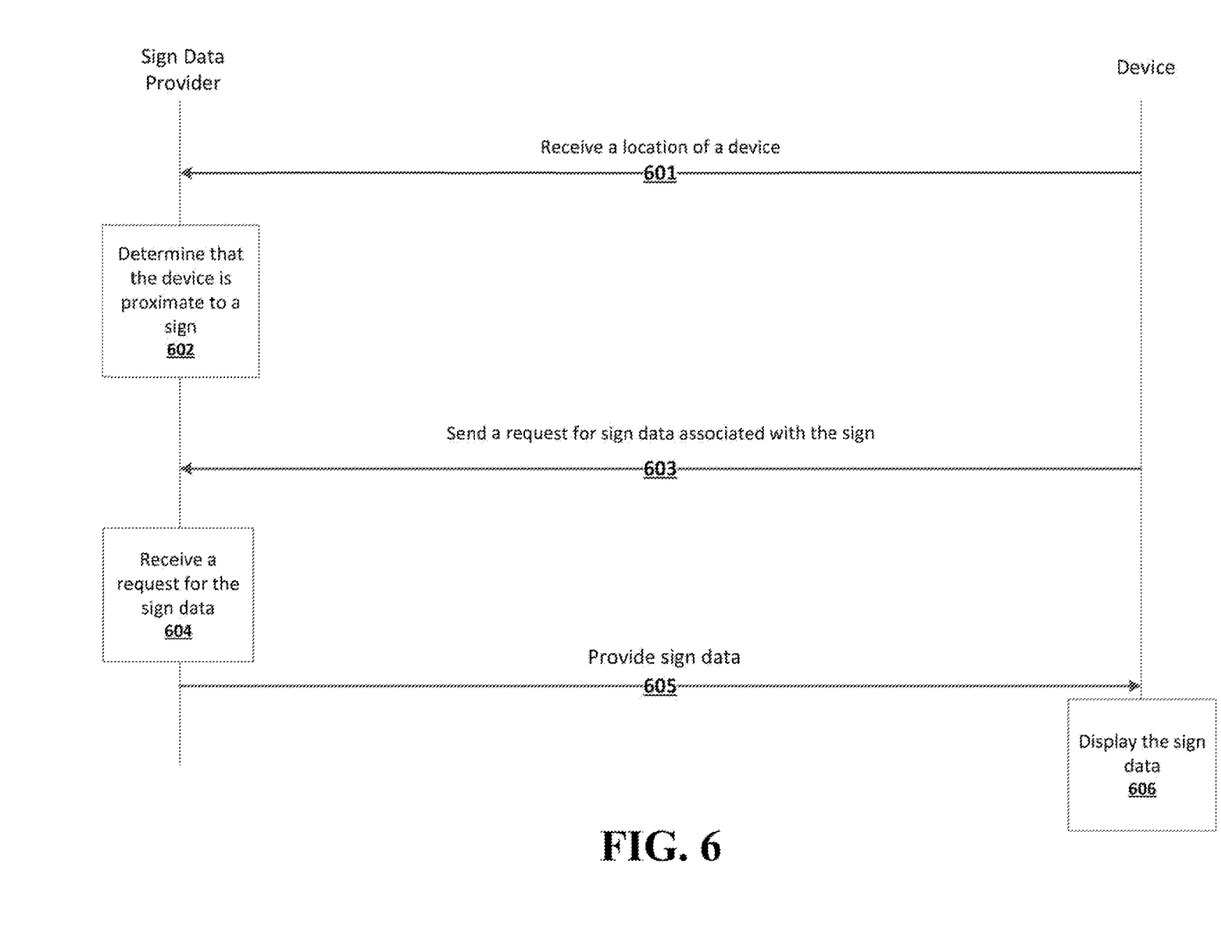
FIG. 6 shows an example information flow according to an implementation of the disclosed subject matter.

An implementation of the disclosed subject matter provides a system, as shown in FIG. 6, which includes a processor configured to receive a location of a device, at 601, and determine that the device is proximate to a sign, at 602. The sign data provider may determine that a device is proximate to a sign based on a location of the sign and determine that the difference in the location of the device and the location of the sign is less than a given threshold. At 603, the device may send a request for sign data associated with the sign, which may be received by the sign data provider at a first time, at 604. As a result, the sign data provider may provide sign data to the device at 605, and the sign data may be displayed at the device, at 606.

Figure 7:
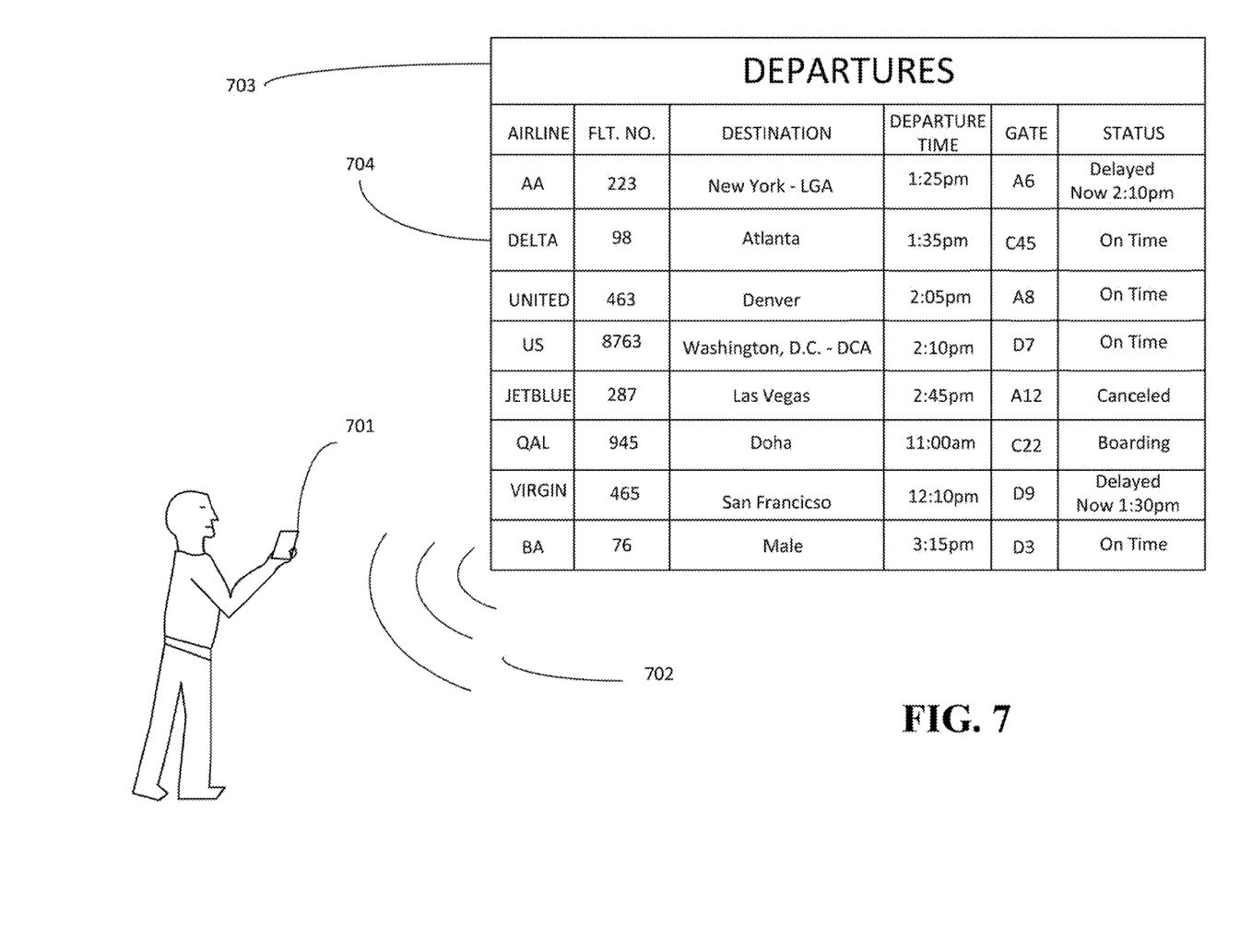
FIG. 7 shows an example sign configuration according to an implementation of the disclosed subject matter.

As an example, FIG. 7 shows a sign configuration according to an implementation of the disclosed subject matter. A user may be walking through an airport carrying a mobile device 701. The user may pass by a sign 703, the sign 703 displaying flight departure information. The user may pause to view the sign 703 and she may see her flight information 704 displayed. While she is proximate to the sign 703, the sign 703 may send a signal 702, such as a Wi-Fi beacon, that is detected by the user's mobile device 701. The mobile device 701 may determine that it is proximate to the sign 703. The sign 703 may automatically provide sign identification information and sign data to the mobile device 701. The sign data may include all the information currently being displayed on the sign 703, including information 704 showing Delta flight 98 with an on time status. She may continue walking and leave the proximity of the sign. At a later time, she may want to check to see if there have been any changes to her flight departure information 704. However, rather than having to walk back over to the sign 703, she may request the current sign data being displayed on sign 703 at her device 701. In particular, the request for current sign data may include the sign identification information and may be sent to a sign data provider. The sign data provider may receive the request for sign data associated with the sign identification information. As a result, the sign data provider may provide the same sign data as is currently being displayed on the sign 703 to her mobile device 701. This updated and/or current flight departure information may indicate that Delta flight 98 has now been delayed until 2:00 pm.

A device may be a mobile device, smartphone, PDA, handheld device, handheld computer, wearable computer, tablet, laptop, a mobile phone, and any other device capable of receiving a signal from a sign. A sign may be any type of presentation of content such as an advertisement, a display, a poster, a billboard, a digital display, and the like. As described above, determining that a device is proximate to a sign may be based on a signal sent and/or received by the device and/or the sign. A signal may be any signal that can be used to determine that the device and the sign are proximate to each other. For example, the signal may be a signal-type including Wi-Fi, near field communications, RFID, Bluetooth, Bluetooth low energy, a location service, or other wireless protocol. As an example, a signal may be a Wi-Fi beacon that includes payload information associated with a sign, such as a sign identifier, sign content, sign location, sign topic, sign type (static, dynamic, frequency of updates, sign owner, etc.) A signal from a sign may include both sign identification information and sign data in the same or different messages. For example, a sign beacon packet can contain a sign identifier and sign data. The signal strength of the beacon may be modulated (for example, in signal strength, signal frequency, the rate at which the signal is sent (e.g., once a minute, five times per second, etc.), transmission pattern (e.g., regularly, pseudo-randomly, at a higher rate when one or more proximate devices are detected, etc.) to create a sign proximity zone, that is, a zone within which with a device is proximate to the sign. For example, the sign may send a beacon signal, the signal having a range that is about equal to a proximity threshold, and the sign may receive a signal from the device in response to the beacon signal, thereby determining that the device is proximate to the sign. For example, a sign may transmit a beacon at regular intervals, and the beacon may include sign identification information, such as a sign identification code. A mobile device may, as part of a regular scan, discover the beacon transmitted by the sign including the sign identification information, and the mobile device may store the sign identification information and the time it received the beacon. The sign identification information and time may be used to uniquely identify the content on the sign and may be used at a later time to retrieve the sign content, including any updates to the sign content since the device was within proximity to the sign. Later, when a user is interested in searching or viewing the signs to which he has been proximate, his mobile device may provide the sign identification information and time to a sign data provider server. The sign data provider server may then match the sign identification information and time with the relevant sign data, and provide this sign data to the mobile device for display to the user.

Additionally, determining that a device is proximate to a sign may be based on the location of the device and the location of the sign. For example, a location of the device may be determined using a location service such as GPS or other location determination technique. A location of the sign may be determined by GPS, querying a database of sign locations or other location determination technique. Next, it may be determined that the difference in the location of the device and the location of the sign is less than a given threshold, and are thereby proximate to each other. The given threshold may vary based on a variety of factors such as the number of signs in a given area, the signal type, and the like. For example, in an area with several signs, the given threshold for determining that the device and sign are proximate may be smaller in order to more precisely determine exactly which sign, among other adjacent signs, the device is proximate to. As another example, the given threshold may be different depending on the signal-type, for example, the threshold distance for determining proximity of the sign and device using an NFC signal may be shorter than using a Bluetooth signal.

Sign identification information may include any information useful for identifying a specific sign. For example, sign identification information may include a sign identification code which may be any combination of alphanumeric characters, symbols, and the like. According to an implementation, information in addition to sign identification information may be provided to a mobile device and/or a sign data provider, such as time, date, location information, display time, and/or dwell time. For example, the time and date may be a point when the mobile device became proximate to a sign or a point when the mobile device is no longer proximate to the sign. The location may be the location of the device or the sign, for example the location at which the device became proximate to a sign or the location of the sign to which the device is proximate. A dwell time may be the time spent by the device in proximity to the sign, e.g., within the proximity threshold of the sign. For example, a user carrying a mobile device may stand within proximity of a sign displaying gate departure information for several minutes. On the other hand, the user may walk by a sign displaying restaurant information and only be within proximity of the sign for a few seconds. A display time may be the amount of time that a particular sign data is displayed on a specific sign. The sign may be an electronic display on which sign data being displayed on the sign is continuously changing. For example, an advertisement for a candy bar may be displayed on the sign for 30 seconds and then may be replaced by an advertisement for a movie that is displayed for 90 seconds. As such, the display time for the candy bar advertisement may be 30 seconds and the display time for the movie advertisement may be 90 seconds.

A request for sign data can be sent to the sign, a sign data provider, a sign database, a cloud-based sign service, and any other similar sign data service. Sign data may be provided to a mobile device and/or to a user account associated with a mobile device. As an example, sending sign identification information (such as a sign identification code) to a user account can include associating the sign identification code with a user account identifier that can be associated with the device. Providing sign data to the user account can include receiving the request for sign data that includes the sign identification information and a user account identifier, retrieving the sign data from a database and sending the sign data to the user account and/or a device from which the user account may be accessed.

In an implementation, the sign data can be stored at one or more of the mobile device, the sign and a cloud-based server. The mobile device can be the device that requested the sign data. The sign can store the requested sign data, for example associated with one or more user credentials. In an implementation where the sign shows rapidly changing information, the sign can store a "snapshot" of the sign data at or about the time it receives the request to store the sign data. The sign data stored at the sign can subsequently be retrieved by the requesting user or another user. Likewise, the sign data can be stored at a cloud-based server from which the data can subsequently be retrieved by the requesting user, another user, the same or another sign and so on.

Sign data may include content of the sign, context of the sign, an image, a link, a content provider, contact information, a version of the sign, an action item, and any other data associated with a sign. The content of a sign may include images, text, and any other content displayed on the sign. The context of the sign can include information about the setting of the sign (e.g., at or near a transportation hub such as a bus stop, a train station, an airport, etc.) the current weather at or near the sign, traffic near the sign, nature of devices and users that have been proximate to the sign and rates at which the devices have been near the sign, etc. An action item may include options and features such as to add information about the sign or sign content to a calendar entry, to a wish list, to a social media network, to a shopping cart, to click for directions, and the like. A version of the sign may be based on a version number and/or the day, time, and/or location when the sign data is requested. If the content of the sign changes over time (e.g., a flight status sign), then updated information can be provided to the device/user. In particular, updated sign data may be provided at a second time after the first time that sign data was presented.

According to an implementation of the disclosed subject matter, a user may be within proximity of a first sign and in response, sign data associated with the first sign may be stored, for example, on the user's device or in a user account. Next, in response to determining that a device is proximate to a second sign, second sign data associated with the second sign may be stored. A request for a sign history from the user may be received and, in response, sign history may be provided to the user.

As discussed above, sign data may be provided to a device or to a user account. For example, sign data may be displayed on the device that received the signal from the sign or may be displayed on another device, such as a PC by accessing a user account. In an implementation, the sign data can be displayed on a requester's mobile device or another user's device. It may also be displayed on the sign itself. For example, for a changing sign, a request to display sign data can reconfigure the display to show at least some previously-displayed sign data, a new arrangement of sign data, etc.

A user may interact and view sign data in a variety of ways. In an implementation, a sign history may be a collection of signs that a user has been within proximity of over time. A sign history may be a list of signs that includes an entry for each sign to which the user has been proximate. An entry in the sign history may be a representation of the sign, such as, a thumbnail of the sign, and may include an image, an action item, a link, a video, text, and any other content associated with the sign. For example, by accessing his sign history, a user may be able to view the signs he has been proximate to during a past certain period of time, this period of time may be designated by the user. By selecting a specific sign entry in his sign history, sign data associated with the sign may be displayed for the user. Additionally, upon selection of a sign entry in his sign history, sign data may be automatically updated to display the most current sign data from that sign. Sign history may include sign identification information, sign data, time, date, dwell time, display time, and the like, associated with the signs to which a user has been proximate. A user may be able to view sign data and/or his sign history by accessing his user account. Storing, filtering, and/or processing of any data associated with a sign, such as sign history, sign identification information, sign data, time, date, dwell time, display time, and the like may occur at various locations such as a device, a sign, a database, a cloud based service, cloud server, a user account, and the like.

Figure 8:
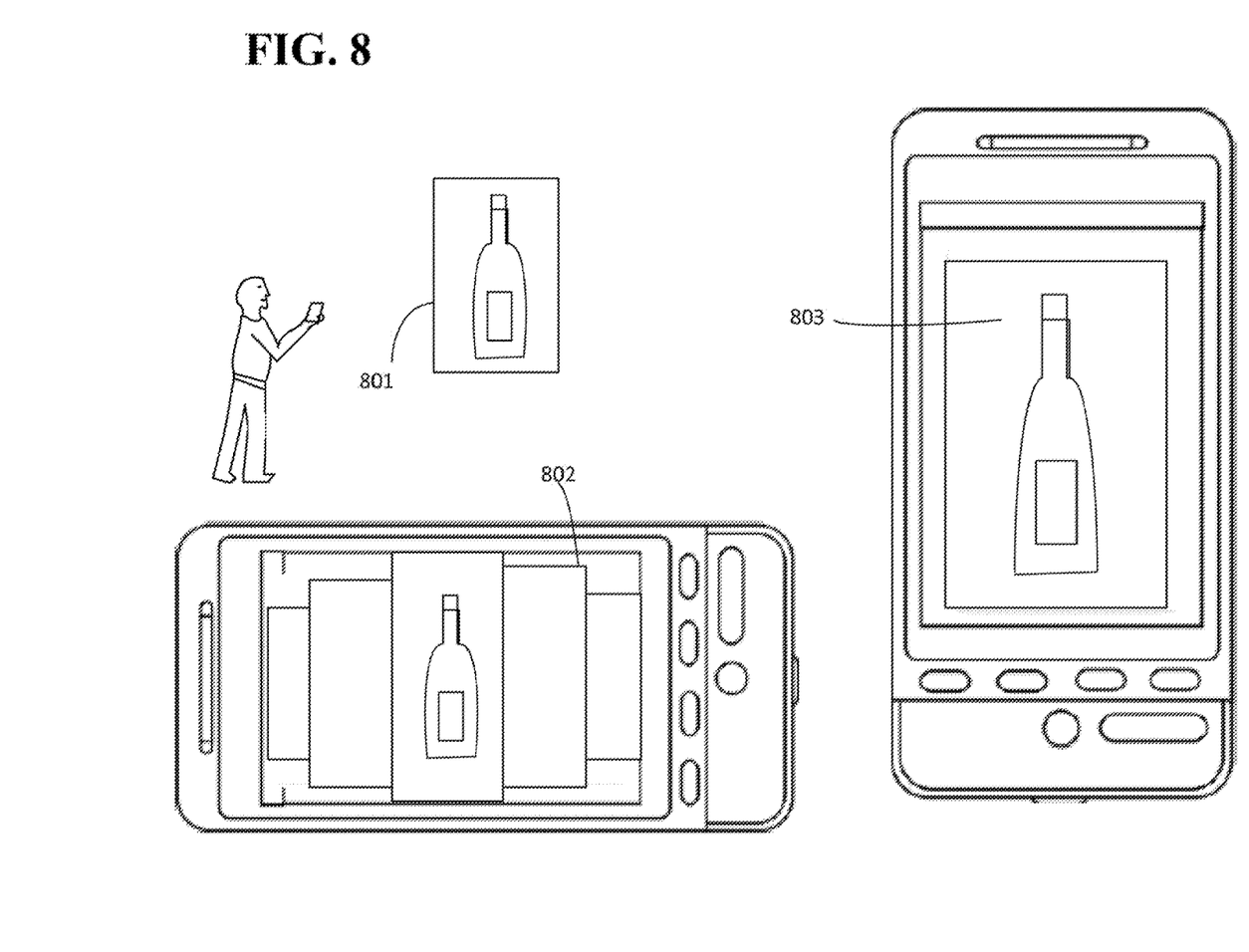
FIG. 8 shows an example configuration and interface according to an implementation of the disclosed subject matter.

FIG. 8 shows an example configuration and interface in accordance with the disclosed subject matter. For example, a user may view and be within proximity of a sign, at 801. Sign data for each sign to which the user has been proximate may be provided to the device and/or a user account associated with a device. As shown, a sign history 802 may include a list of sign entries representing the signs to which the user has been proximate. Each sign entry may include sign data associated with the sign, which may be displayed on the device. A user may be able to review and browse through sign entries and sign data associated with the signs to which he has been proximate. Additionally, a user may be able to select a sign entry 803 and revisit a sign in his sign history. As shown, the sign entry 803 may be a thumbnail representation of the sign 801. Furthermore, a user may be able to view sign history associated with his user account on his mobile device, or on any other device from which he may access his user account.

The sign interface may display sign data and/or sign history to a user. The sign interface may also include various features for browsing, searching, and/or filtering sign data and sign history. The sign history may present sign entries in chronological order or based on some other criteria, which may be specified by a user. For example, sign data and/or sign history may be filtered based on a variety of criterion such as day, time, location, dwell time, display time, content, subject matter, type of sign data, recently updated sign data, sign type, sign owner, geographical landmark associated with the sign, and the like. A user may be able to search within sign data and/or sign history for text, keywords, and other specific filtering criteria. Additionally, a user may be able to set parameters and preferences for the types of sign data that are stored, collected, provided, and/or displayed. For example, sign data may only be stored upon manual selection by a user (e.g., when the user is proximate to the sign), data about all signs to which the user was proximate for the past certain period of time (which may be designated by the user) may be stored, data about all signs of a given topic, owner, type, etc., may be stored in accordance with parameters specified by the user and so on.

In an implementation, the communication between a device, a sign, and a sign data provider may be across one or more bridges between the interfaces. For example, the communications between device, a sign, and a sign data provider may be managed or assisted by a third device, such as, a coordinating device, a local coordinator, a remote server, etc. In such cases, the third device may, for example, receive the location of the device and determine the location of the sign. The third device may then provide sign identification information to the sign data provider, in which case, the sign data provider may provide sign data to the device. Alternatively, the third device may receive sign identification information from the device and provide the sign identification information to the sign data provider. The sign data provider may retrieve sign data from the sign associated with the sign identification information. Accordingly, the sign data provider may provide sign data to the device. In an embodiment, the third device may also act as a bridge between the sign data provider and the device when determining that device is proximate to a sign, providing sign identification information associated with a sign, receiving a request for sign data, and providing sign data to the device. Furthermore, more than one intermediate device may be implemented to facilitate communication between devices and a sign data provider.

In situations in which the implementations of the disclosed subject matter collect personal information about users, or may make use of personal information, the users may be provided with an opportunity to control whether programs or features collect user information (e.g., user's location, user's preferences, user account details, user location history, sign history, and other user information upon which sign data may be based), or to control whether and/or how to receive sign content from a sign content server that may be more relevant to the user. Personal information about a user and/or a user's sign history may be stored in a cloud-based server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a sign content server.

Figure 9:
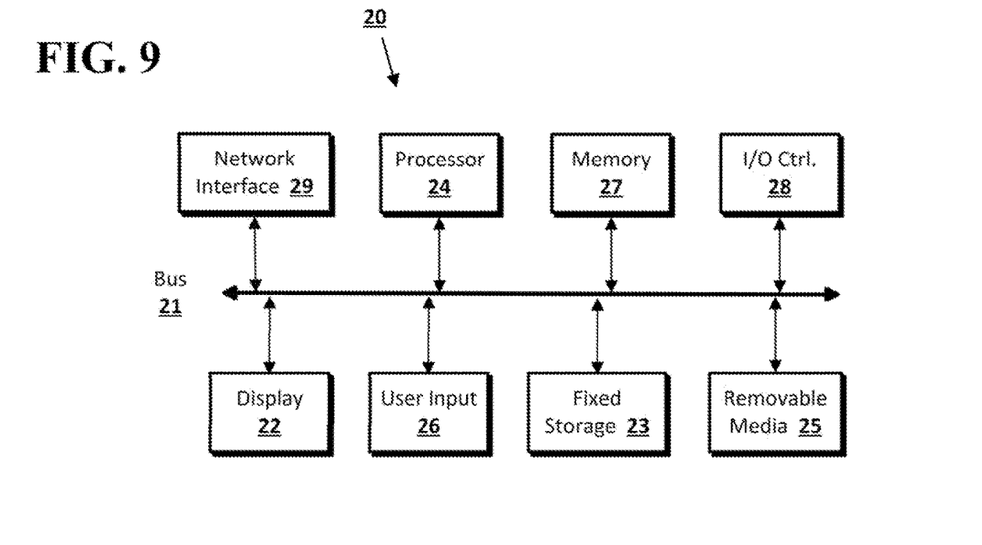
FIG. 9 shows a computer according to an embodiment of the disclosed subject matter.

Embodiments of the presently disclosed subject matter may be implemented in and used with a variety of component and network architectures. FIG. 9 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 10.

Many other devices or components (not shown) may be connected in a similar manner (e.g., document scanners, digital cameras and so on). Conversely, all of the components shown in FIG. 9 need not be present to practice the present disclosure. The components can be interconnected in different ways from that shown. The operation of a computer such as that shown in FIG. 9 is readily known in the art and is not discussed in detail in this application. Code to implement the present disclosure can be stored in computer-readable storage media such as one or more of the memory 27, fixed storage 23, removable media 25, or on a remote storage location.

Figure 10:
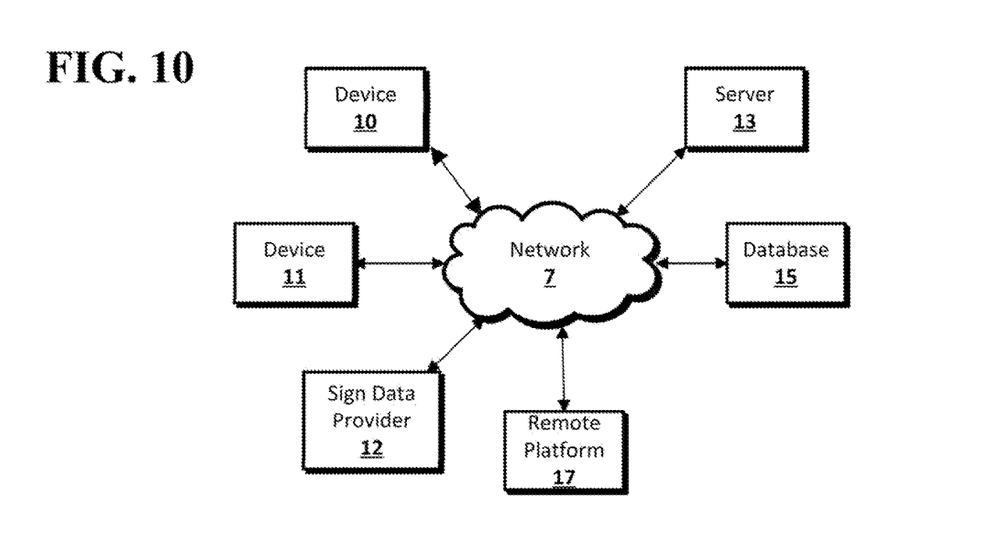
FIG. 10 shows a network configuration according to an embodiment of the disclosed subject matter.

FIG. 10 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more sign data providers 12, servers 13 and/or databases 15. The devices may be directly accessible by the clients 10, 11, or one or more other devices may provide intermediary access such as where a server 13, and/or sign data provider 12 provides access to resources stored in a database 15. The clients 10, 11 also may access remote platforms 17 or services provided by remote platforms 17 such as cloud computing arrangements and services. The remote platform 17 may include one or more sign data providers 12, servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising:
receiving, by a mobile device and from a digital sign, a beacon signal;
storing, in a storage of the mobile device, data indicating a particular time at which the beacon signal was received;
in response to receiving the beacon signal, determining, by one or more processors in the mobile device, that the digital sign is located within a threshold distance of a mobile device;
receiving, by the mobile device and from the digital sign, sign identification information that identifies the digital sign;
receiving, by the mobile device, an input indicating that the digital sign has been selected on the mobile device;
in response to receiving the input indicating that the digital sign has been selected on the mobile device, transmitting, by the mobile device and to a server over one or more wireless networks, a request for data corresponding to information that was displayed on the selected digital sign at the particular time at which the beacon signal was received, the request including the sign identification information and data indicating the particular time at which the beacon signal was received; and
displaying, using a sign interface output by a display in the mobile device, the information that was displayed on the selected digital sign at the particular time at which the beacon signal was received upon receiving the data corresponding to the information displayed on the selected digital sign.

2. The computer-implemented method of claim 1, wherein:
the data indicating the particular time at which the beacon signal was received are stored in a sign history in the storage.

3. The computer-implemented method of claim 1, wherein determining, by the one or more processors in the mobile device, that the digital sign is located within the threshold distance of the mobile device comprises:
determining, using global positioning service data indicating a location of the mobile device, that a difference between the location of the mobile device and a location of the digital sign at the particular time satisfies a differential threshold distance, the differential threshold distance being based on one or more of (i) a number of signs in proximity of the digital sign, and (ii) a type of beacon signal.

4. The computer-implemented method of claim 1, wherein receiving the data corresponding to the information displayed on the selected digital sign includes receiving data indicative of one or more of: (i) weather conditions in a vicinity of the sign at a time at which the request for data corresponding to information displayed on the selected digital sign was transmitted, (ii) traffic conditions in a vicinity of the sign at the time at which the request for data corresponding to information displayed on the selected digital sign was transmitted, (iii) one or more devices that have been proximate to the sign for a time period before the time at which the request for data corresponding to information displayed on the selected digital sign was transmitted; and (iv)an action feature, which upon activation, provides sign information to a designated destination.

5. The computer-implemented method of claim 4, wherein the time at which the request for data corresponding to information displayed on the selected digital sign was received corresponds to a time at which the digital sign is located outside the threshold distance of the mobile device.

6. The computer-implemented method of claim 1, wherein receiving the input indicating that the digital sign has been selected on the mobile device includes:
receiving a user selection of a particular digital sign from a list of a plurality of digital signs included in a sign history that includes data indicative of digital signs that have been within the threshold distance of the mobile device before the particular time.

7. The computer-implemented method of claim 1, further comprising:
automatically receiving a second set of data corresponding to updated information displayed on the selected digital sign at a time after displaying the information displayed on the selected digital sign; and
displaying the second set of data corresponding to updated information displayed on the selected digital sign.

8. A non-transitory computer-readable storage medium encoded with a computer program, the computer program comprising instructions that, upon execution by a computer, cause the computer to perform operations comprising:
receiving, from a digital sign, a beacon signal;
storing, in a storage of the computer, data indicating a particular time at which the beacon signal was received;
in response to receiving the beacon signal, determining, by one or more processors in the computer, that the digital sign is located within a threshold distance of a mobile device;
receiving, from the digital sign, sign identification information that identifies the digital sign;
receiving an input indicating that the digital sign has been selected on the mobile device;
in response to receiving the input indicating that the digital sign has been selected on the mobile device, transmitting, to a server over one or more wireless networks, a request for data corresponding to information that was displayed on the selected digital sign at the particular time at which the beacon signal was received, the request including the sign identification information and data indicating the particular time at which the beacon signal was received; and
displaying, using a sign interface output by a display in the computer, the information that was displayed on the selected digital sign upon receiving the data corresponding to the information displayed on the selected digital sign.

9. The non-transitory computer-readable storage medium of claim 8, wherein:
the data indicating the particular time at which the beacon signal was received are stored in a sign history in the storage.

10. The non-transitory computer-readable storage medium of claim 8, wherein determining, by the one or more processors in the computer, that the digital sign is located within the threshold distance of the mobile device comprises:
determining, using global positioning service data indicating a location of the mobile device, that a difference between the location of the mobile device and a location of the digital sign at the particular time satisfies a differential threshold distance, the differential threshold distance being based on one or more of (i) a number of signs in proximity of the digital sign, and (ii) a type of beacon signal.

11. The non-transitory computer-readable storage medium of claim 8, wherein receiving the data corresponding to the information displayed on the selected digital sign includes receiving data indicative of one or more of: (i) weather conditions in a vicinity of the sign at a time at which the request for data corresponding to information displayed on the selected digital sign was transmitted, (ii) traffic conditions in a vicinity of the sign at the time at which the request for data corresponding to information displayed on the selected digital sign was transmitted, (iii) one or more devices that have been proximate to the sign for a time period before the time at which the request for data corresponding to information displayed on the selected digital sign was transmitted; and (iv) an action feature, which upon activation, provides sign information to a designated destination.

12. The non-transitory computer-readable storage medium of claim 11, wherein the time at which the request for data corresponding to information displayed on the selected digital sign was received corresponds to a time at which the digital sign is located outside the threshold distance of the mobile device.

13. The non-transitory computer-readable storage medium of claim 8, wherein receiving the input indicating that the digital sign has been selected on the mobile device includes:
receiving a user selection of a particular digital sign from a list of a plurality of digital signs included in a sign history that includes data indicative of digital signs that have been within the threshold distance of the mobile device before the particular time.

14. The non-transitory computer-readable storage medium of claim 8, wherein the operations further comprise:
automatically receiving a second set of data corresponding to updated information displayed on the selected digital sign at a time after displaying the information displayed on the selected digital sign; and
displaying the second set of data corresponding to updated information displayed on the selected digital sign.

15. A system comprising:
one or more processors and one or more computer storage media storing instructions that are operable and when executed by the one or more processors, cause the one or more processors to perform operations comprising:
receiving, from a digital sign, a beacon signal;
controlling a storage to store data indicating the particular time at which the beacon signal was received;
in response to receiving the beacon signal, determining that the digital sign is located within a threshold distance of a mobile device;
receiving, from the digital sign, sign identification information that identifies the digital sign;
receiving an input indicating that the digital sign has been selected on the mobile device;
in response to receiving the input indicating that the digital sign has been selected on the mobile device, transmitting, to a server over one or more wireless networks, a request for data corresponding to information that was displayed on the selected digital sign at the particular time at which the beacon signal was received, the request including the sign identification information and data indicating the particular time at which the beacon signal was received; and
controlling a sign interface output by a display to display the information that was displayed on the selected digital sign upon receiving the data corresponding to the information displayed on the selected digital sign.

16. The system of claim 15, wherein:
the data indicating the particular time at which the beacon signal was received are stored in a sign history in the storage.

17. The system of claim 15, wherein determining that the digital sign is located within the threshold distance of the mobile device comprises:
determining, using global positioning service data indicating a location of the mobile device, that a difference between the location of the mobile device and a location of the digital sign at the particular time satisfies a differential threshold distance, the differential threshold distance being based on one or more of (i) a number of signs in proximity of the digital sign, and (ii) a type of beacon signal.

18. The system of claim 15, wherein receiving the data corresponding to the information displayed on the selected digital sign includes receiving data indicative of one or more of: (i) weather conditions in a vicinity of the sign at a time at which the request for data corresponding to information displayed on the selected digital sign was transmitted, (ii) traffic conditions in a vicinity of the sign at the time at which the request for data corresponding to information displayed on the selected digital sign was transmitted, (iii) one or more devices that have been proximate to the sign for a time period before the time at which the request for data corresponding to information displayed on the selected digital sign was transmitted; and (iv) an action feature, which upon activation, provides sign information to a designated destination, and     wherein the time at which the request for data corresponding to information displayed on the selected digital sign was received corresponds to a time at which the digital sign is located outside the threshold distance of the mobile device.

19. The system of claim 15, wherein receiving the input indicating that the digital sign has been selected on the mobile device includes:

receiving a user selection of a particular digital sign from a list of a plurality of digital signs included in a sign history that includes data indicative of digital signs that have been within the threshold distance of the mobile device before the particular time.

20. The system of claim 15, wherein the operations further comprise:

automatically receiving a second set of data corresponding to updated information displayed on the selected digital sign at a time after displaying the information displayed on the selected digital sign; and     controlling the sign interface output by the display to display the second set of data corresponding to updated information displayed on the selected digital sign.

\* \* \* \* \*